United States Patent
Ohtsubo

(10) Patent No.: US 7,076,171 B2
(45) Date of Patent: Jul. 11, 2006

(54) OPTICAL SPACE TRANSMITTER

(75) Inventor: Masatoshi Ohtsubo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 829 days.

(21) Appl. No.: 09/822,337

(22) Filed: Apr. 2, 2001

(65) Prior Publication Data

US 2001/0043380 A1  Nov. 22, 2001

(30) Foreign Application Priority Data

Apr. 6, 2000 (JP) .............................. 2000-104555

(51) Int. Cl.
*H04B 10/00* (2006.01)
(52) U.S. Cl. ..................................... 398/129; 398/131
(58) Field of Classification Search ........ 398/118–131, 398/196; 359/196, 820
See application file for complete search history.

(56) References Cited

U.S. PATENT DOCUMENTS

| | | | | | |
|---|---|---|---|---|---|
| 4,023,756 | A | * | 5/1977 | Baker ........................... | 248/59 |
| 4,116,537 | A | * | 9/1978 | Dilworth ...................... | 359/820 |
| 5,627,669 | A | * | 5/1997 | Orino et al. ................. | 398/129 |
| 6,493,122 | B1 | * | 12/2002 | Degura ........................ | 398/128 |
| 2002/0051270 | A1 | * | 5/2002 | Tatsuno et al. ............. | 359/187 |

* cited by examiner

*Primary Examiner*—David C. Payne
(74) *Attorney, Agent, or Firm*—Fitzpatrick, Cella, Harper & Scinto

(57) ABSTRACT

Optical space transmission device including a light source for emitting a light beam modulated according to a signal to be transmitted, an optical system for sending out the light beam emitted from the light source as a transmission light beam with an angle of expansion, a temperature detector for detecting the internal temperature of the device, and control means for changing the angle of expansion of the transmission light beam as a function of the temperature detected by the temperature detector.

5 Claims, 3 Drawing Sheets

OPTICAL SPACE TRANSMITTER

BACKGROUND OF THE INVENTION

1. Field of the Invention

This invention relates to an optical space transmitter for bidirectionally transmitting information between remote sites by way of light beams using a common optical axis for both transmitted beams and received beams.

2. Related Background Art

Generally, optical space transmitters/receivers for transmitting information to a remote site and receiving information from the remote site by means of optical beams have a disadvantage that the optical axis of the beam transmitted from the partner transmitter for signal transmission/reception and that of the light receiving section of the receiver can become displaced from each other for a variety of reasons, including natural phenomena such as winds and sun beams and man-made problems, and end up with totally disrupted communications, in the worst case. Therefore, an optical space transmitter is normally provided with an angle correction feature for correcting the angular displacement of the beam for signal transmission/reception.

FIG. 1 of the accompanying drawings schematically illustrates a principal part of a conventional optical space transmitter/receiver. Referring to FIG. 1, the signal to be transmitted that is inputted through input terminal 14 is sent to light source 1 (electrooptic converter) adapted to emit a beam that is modulated according to the signal. The light beam emitted from the light source 1 is then sent out by way of lens 2, beam splitter 3, tracking mirror 4 and lenses 5 and 6. On the other hand, the beam transmitted from the partner transmitter is received by way of the lenses 6 and 5 and led to the light receiving section by way of the tracking mirror 4 and the beam splitter 3 and then divided into two beams by half mirror 7 to proceed in two directions. One of the beams is reflected by the half mirror 7 and collected, by way of lens 10, by first photodetector (main signal receiving section) 8 that converts the beam into a reception signal, which is then taken out through output terminal 15. The other beam is transmitted through the half mirror 7 and collected, by way of lens 11, by second photodetector (angle error detector) 9.

The second photodetector (angle error detector) 9 detects the angular displacement of the optical axis of the beam transmitted from the partner transmitter and the optical axis of the angle error detector that is typically indicated by the optical axis of the lens 11. Then, optical axis angular regulation drive control section 12 controls actuator 13 on the basis of the information on the angular displacement and automatically corrects the angular displacement by regulating the angle of the tracking mirror 4.

For the second photodetector (angle error detector) 9 to detect the angular displacement and direct the transmission light beam accurately to the partner device, it is necessary to make the optical axis L1 of the transmission light beam outputted from the light source (transmitting section) 1 of the transmitter/receiver and the optical axis L2 of the angle error detector (the optical axis of the lens 11) agree with each other within the device in advance. In order to make the two optical axes L1 and L2 agree with each other, it is necessary to make the optical axes L1 and L2 to follow a same light path between the tracking mirror 4 and the beam splitter 3. In operation, the depicted device constantly detects the angular displacement between the optical axis L3 of the beam transmitted from the partner device and received by the depicted device and the optical axis L2 of the angle error detector of the depicted device, that is the optical axis L1 of the beam transmitted from the present device, and, if necessary, correct it to eliminate any relative displacement of the two optical axes.

However, with the above described known transmitter/receiver, particularly when the device is arranged outdoors and rises to almost about 40° C. during the day time in the Summer in Japan, raising the internal temperature of the device even further, the optical system including the lens barrel can thermally expand to produce a relative displacement between the optical axis of the beam to be transmitted and that of the received beam.

Particularly, when ambient temperature is too high or too low, the optical axis L1 of the beam to be transmitted from the transmitter of the device and the optical axis of the angle error detector (the optical axis of the lens 11) L2 are displaced, if only slightly, from each other due to the expanded or compressed optical system including the lens barrel. Therefore, the optical axis L1 of the beam to be transmitted from the depicted device and the optical axis L3 of the received light beam transmitted from the partner device do not agree with each other even if the angular displacement of the optical axis L3 of the received light beam transmitted from the partner device and the optical axis L2 of the angle error detector (the optical axis of the lens 11) is detected and corrected. Then, it is not possible to reliably transmit a beam to the partner device.

Additionally, when the external factors including winds and sun beams are most unfriendly, the light beam transmitted from the device A can partly go astray from the partner device B as shown in FIG. 2 and end up with a total inability of communication. A countermeasure taken for remedying this problem is the use of a large beam diameter for the purpose of accommodating the displacement of the possible optical axis so that the optical axis of the beam transmitted from the own device A may not be totally moved away from the partner device B. However, if ambient temperature in operation is in the temperature level used for regulating the optical axis and close to room temperature, it is not necessary to use a large beam diameter because the displacement of the optical axis is, if any, very small. Since the quantity of light the partner device B receives per unit time decreases by an amount inversely proportional to the square of the increase in the beam diameter, the allowable attenuation of the transmission path is disadvantageously reduced most of the time, except the time when ambient temperature is extremely high and the time when it is extremely low.

Additionally, the expansion/compression of the optical system due to temperature changes entails, beside the above optical axis displacement, a change in the distance between the transmitting section and the lens to consequently displace the focal point of the optical system because the transmitting section is moved away from the stretch of the focal length of the lens by the thermal expansion of the lens barrel to consequently change the angle of expansion of the beam transmitted from the device. Since this change narrows the angle of expansion at high temperature, it goes far below the desired angle when the external factors including winds and sun beams are most unfriendly so that the light beam from the device can be moved away from the partner device to end up with a total inability of communication. If, to the contrary, the angle of expansion is too wide, the quantity of light the partner device receives per unit time is reduced too much, which in turn reduces the allowable attenuation of the transmission path.

SUMMARY OF THE INVENTION

In view of the problems of the conventional technology, it is therefore the object of the present invention to provide an optical space transmitter that can reliably transmit a light beam from the own device to the partner device with a minimum waste of light.

According to the invention, the above object is achieved by providing an optical space transmitter comprising:

a light source for emitting a light beam modulated according to a signal to be transmitted;

an optical system for sending out the light beam emitted from said light source as transmission light beam with an angle of expansion;

a temperature detector for detecting the internal temperature of the optical space transmitter; and a control means for changing the angle of expansion of said transmission light beam as a function of the temperature detected by said temperature detector.

DESCRIPTION OF THE PREFERRED EMBODIMENT

Now, the present invention will be described by referring to FIGS. 3 through 5 of the accompanying drawings that illustrate a preferred embodiment of the invention.

Figure 1:
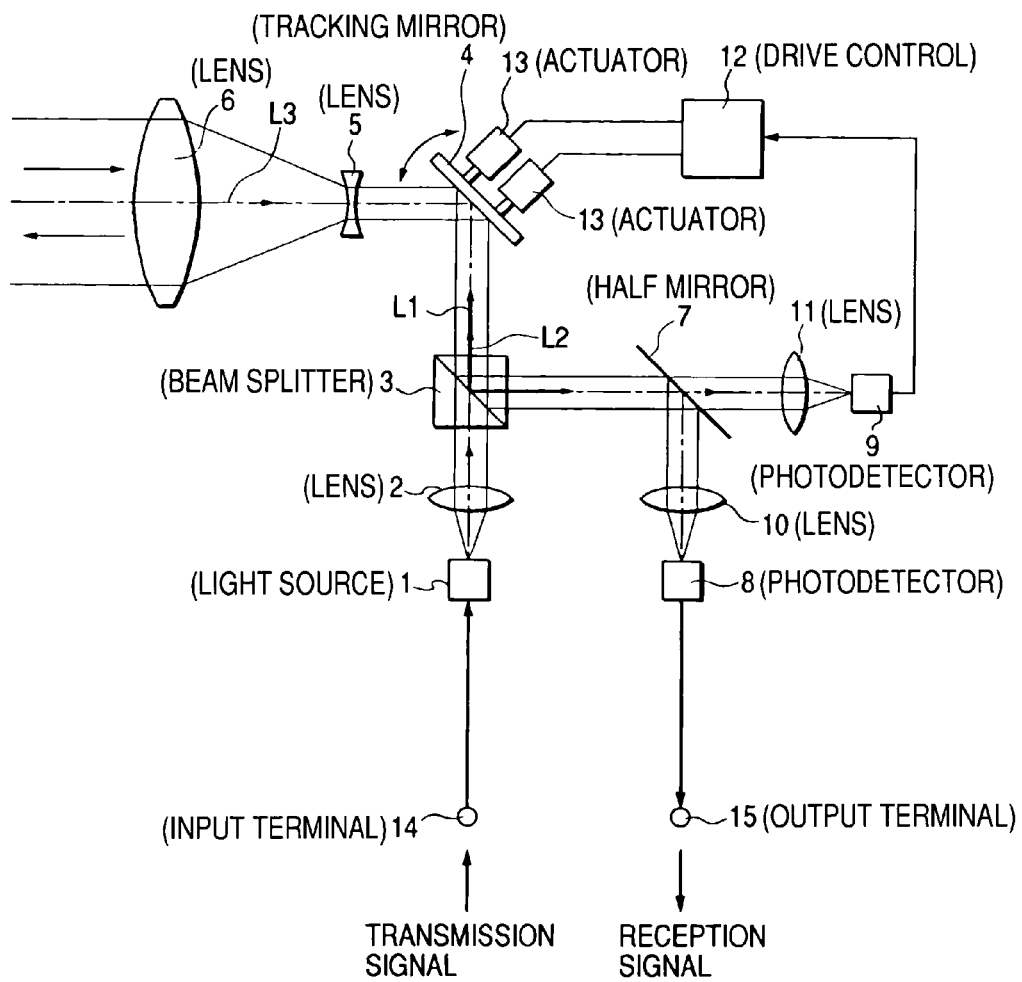
FIG. 1 is a schematic illustration of a principal part of a conventional optical space transmitter.
Figure 2:
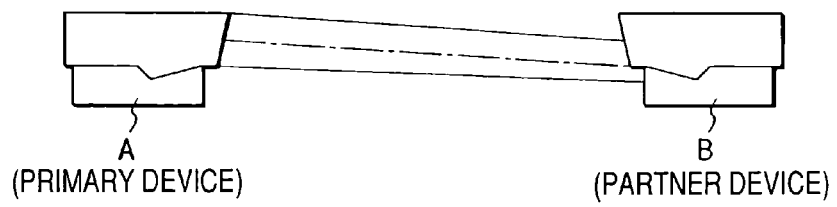
FIG. 2 is a schematic illustration of a space light transmission system using a conventional optical space transmitter.
Figure 3:
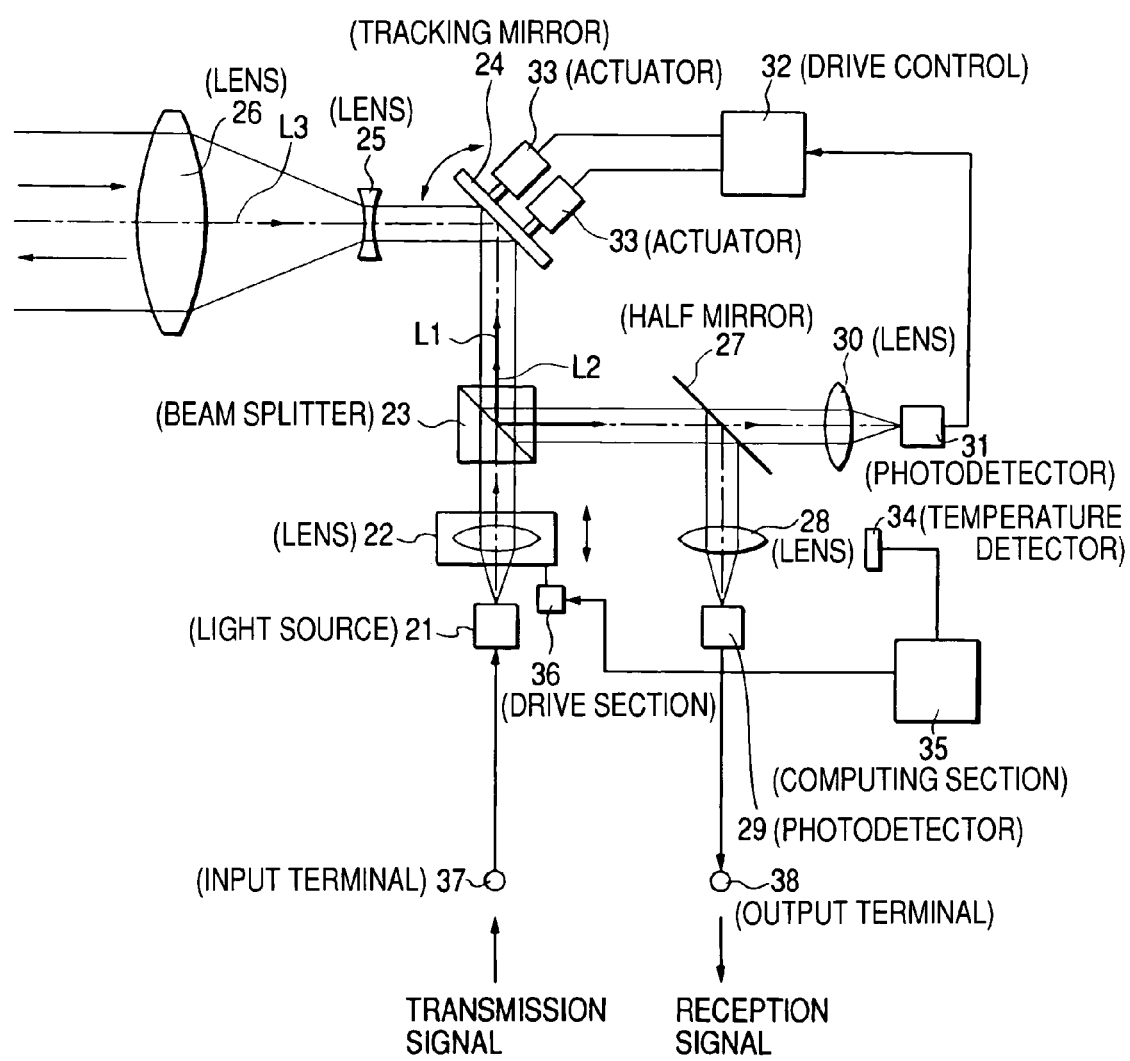
FIG. 3 is a schematic illustration of a principal part of an embodiment of optical space transmitter according to the invention.

FIG. 3 is a schematic illustration of a principal part of an embodiment of an optical space transmitter according to the invention. Referring to FIG. 3, a transmission signal enters light source (transmitter section) 21 by way of input terminal 37. The light source 21 emits a light beam that is modulated according to the transmission signal. Along the light path of the light beam there are sequentially arranged a drive lens 22 movable along the optical axis, a beam splitter 23 and a tracking mirror 24 that can change the angle of reflection as viewed from the light source 21. Lenses 25 and 26 are arranged in the direction in which light is reflected by the tracking mirror 24.

On the other hand, a half mirror 27 is arranged in the direction in which light is reflected by the beam splitter 23 and adapted to divide the light beam it receives in two directions. Then, a lens 28 and a first photodetector (main signal receiver) 29 are arranged in the direction in which light is reflected by the half mirror 27. Additionally, a lens 30 and a second photodetector (angle error detector) 31 are arranged in the direction in which light is transmitted by the half mirror 27. The output of the second photodetector is inputted to an optical axis angular regulating drive control section 32.

A temperature detector 34 for detecting the internal temperature of the device is arranged near the optical system in the device. The detection signal of the temperature detector 34 is inputted to a computing section 35. The computing section 35 computes the angle of expansion of the light beam to be transmitted from the detection signal (the detected temperature), performing predetermined arithmetic operations. The output of the computing section 35 is inputted to drive section 36, which moves the drive lens 22 in the direction of the optical axis according to the output of the computing section 35.

The transmission light emitted from the light source (electrooptic converter) 21 is transmitted through the drive lens 22 and the beam splitter 23, reflected by the tracking mirror 24 and then transmitted through the lenses 25 and 26 before being sent out to the partner device.

On the other hand, the reception light beam transmitted from the partner device and received by the depicted device is transmitted through the lenses 26 and 25 in the direction opposite to the direction of transmission of the sent out light beam, reflected by the tracking mirror 24 and then by the beam splitter 23 and divided into two directions by the half mirror 27. One of the light beams is reflected by the half mirror 27 and converged to the first photodetector (main signal receiver) 29 by way of lens 28. The optical axis angular regulating drive control section 32 controls the actuator 33 to regulate the angle of the tracking mirror 24 and automatically correct the angular displacement, if any, on the basis of the information on angular displacement obtained by the second detector (angle error detector) 31.

Like the above described conventional device, in order to detect the angular displacement of the optical axis of the light beam to be transmitted and that of the received light beam and correctly direct the light beam to be transmitted to the partner device, the optical axis L1 of the light beam outputted from the light source (transmitter section) 21 and the optical axis L2 of the second photodetector (angle error detector) 31 that is typically indicated by the optical axis of the lens 30 are made to agree with each other in advance within the device. Then, when the optical space transmitter is in operation, any relative displacement of the optical axes can be prevented from taking place by detecting and correcting the angular displacement between the optical axis L3 of the received light beam transmitted from the partner device and the optical axis L2 of the angle error detector (and of the lens 30), or the optical axis L1 of the light beam to be transmitted from the own device.

Figure 4:
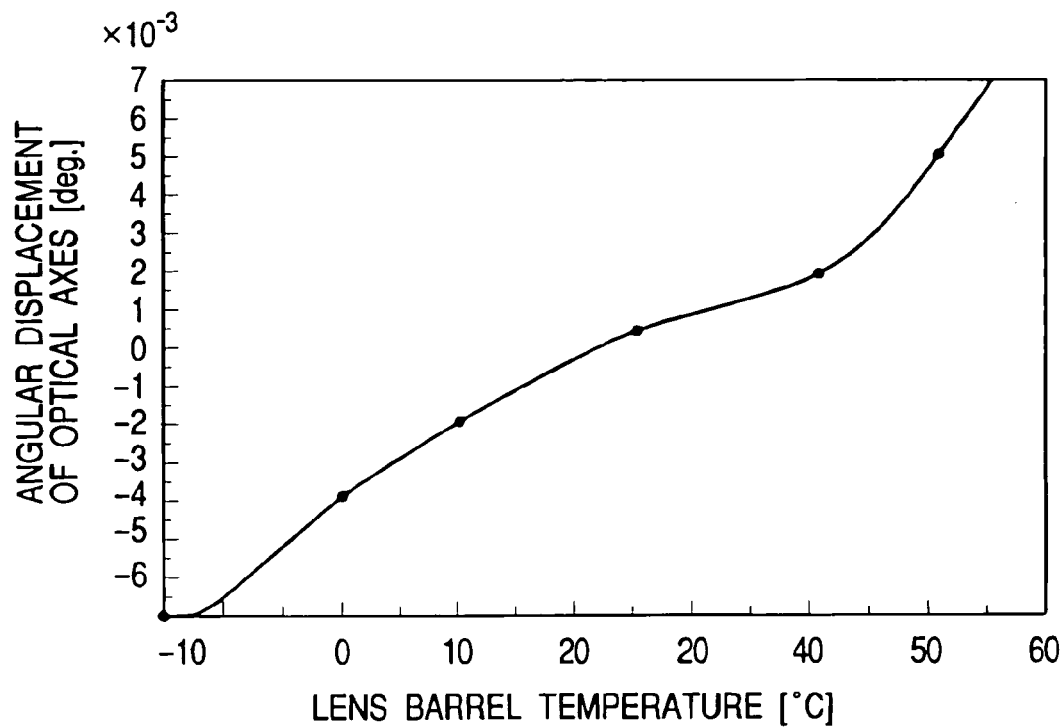
FIG. 4 is a graph illustrating the relationship between the lens barrel temperature and the angular displacement of the optical axis of the embodiment of FIG. 3.

FIG. 4 is a graph illustrating the relationship between the lens barrel temperature and the angular displacement of the optical axis. In FIG. 4, the horizontal axis represents the lens barrel temperature (° C.) and the vertical axis represents the (amount of) angular displacement of the optical axes. The computing section 35 determines the appropriate angle of expansion in response to the detection signal sent from the temperature detector 34 on the basis of the relationship obtained in advance and outputs the result of computation to the drive section 36. The drive section 36 in turn drives the drive lens 22 along the optical axis according to the signal outputted from the computing section 35 to regulate the angle of expansion. Note that, in this embodiment, the computing section 35 operates on the assumption that the internal temperature of the device as detected by the temperature detector 34 is equal to the temperature of the lens barrel of the optical system.

Figure 5:
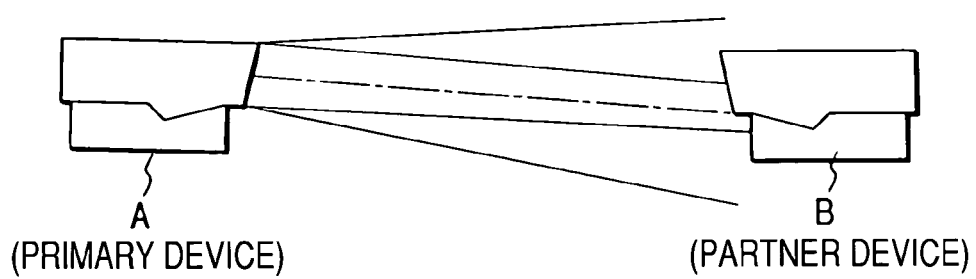
FIG. 5 is a schematic illustration of a space light transmission system using the embodiment of FIG. 3.

As described above, when the ambient temperature is high, the optical space transmitter increases the angle of expansion of the light beam transmitted from the device A in a manner as illustrated in FIG. 5 by way of the control system operating to respond to temperature changes so that it can transmit reliably a light beam to the partner device B. While the intensity of the light beam received by the partner device B may be attenuated as a function of ambient temperature, it is normally fine with strong sun beams when ambient temperature is high and hence the visibility is good so that no inability of communication will occur.

If a shower comes thereafter to reduce the temperature in the device, the displacement of the optical axis of the received light beam and that of the light beam to be transmitted becomes minimal. With this embodiment, as the temperature detector 34 detects the temperature fall, the drive section 36 moves the drive lens 22 along the optical axis according to the output of the temperature detector 34 to reduce the angle of expansion of the beam.

With the above described conventional device that uses a constant beam diameter by taking the possible displacement of the optical axes into consideration, the quantity of light received by the device per unit time is smaller in the case of assuming a large relative displacement than in the case of assuming little displacement so that the communication in the former case can become totally disrupted when the light beam is attenuated by rain. On the other hand, since this embodiment is adapted to control the beam diameter so as to make it restore the original dimension when the light beam can be attenuated by way of the above described control process, the received light beam can reliably secure a sufficient degree of intensity to establish a reliable communication.

As described above in detail, an optical space transmitter according to the invention is so designed that the allowable attenuation of light is raised by narrowing the angle of expansion of the light beam to be transmitted when ambient temperature is at a normal level and there is practically no displacement between the optical axis of the light beam to be transmitted and that of the received light beam, and the angle of expansion is made to vary as a function of the displacement of the optical axes that arises when ambient temperature rises or falls extremely. With this arrangement, the light beam being transmitted from the device can reliably get to the partner device to establish a stable transmission system that can minimize the possible waste of light.

What is claimed is:

1. An optical space transmitter comprising:
   a light source for emitting a light beam modulated according to a signal to be transmitted;
   an optical system for sending out the light beam emitted from said light source as a transmission light beam with an angle of expansion;
   a temperature detector for detecting the internal temperature of said optical space transmitter;
   control means for controlling said optical space transmitter such that the angle of expansion increases when the internal temperature detected by said temperature detector rises; and
   angle correcting means for correcting the angular displacement between the light beam to be transmitted and a received light beam.
   wherein said control means includes a computing circuit for determining by computation an appropriate angle of expansion of the light beam to be transmitted on the basis of the temperature detected by said temperature detector and a drive means for driving at least part of said optical system in the direction of the optical axis according to the outcome of the computation of the computing circuit.

2. An optical space transmitter further comprising:
   a light source for emitting a light beam modulated according a signal to be transmitted;
   an optical system for sending out the light beam emitted from said light source as a transmission light beam with an angle of expansion;
   a temperature detector for detecting the internal temperature of said optical space transmitter;
   a controller for controlling said optical transmitter such that the angle of expansion increases when the internal temperature detected by said temperature detector rises;
   an angle corrector for correcting the angular displacement between the light beam to be transmitted and a received light beam; and
   a light receiver for detecting the angular displacement between the light beam to be transmitted and the received light beam.

3. An optical space transmitter comprising:
   a light source for emitting a light beam modulated according to a signal to be transmitted;
   an optical system for sending out the light beam emitted from said light source as a transmission light beam with an angle of expansion;
   a temperature detector for detecting the internal temperature of said optical space transmitter;
   control means for controlling said optical space transmitter such that the angle of expansion increases when the internal temperature detected by said temperature detector rises; and
   angle correcting means for correcting the angular displacement between the light beam to be transmitted and a received light beam,
   wherein said angle correcting means has a tracking mirror arranged on the optical path of the light beam to be transmitted and the received light beam and an actuator for changing the angle of the tracking mirror.

4. An optical space transmitter according to claim 3, wherein said optical system includes a beam splitter for separating the received light beam from the light beam to be transmitted and a half mirror for dividing the received light beam separated by the beam splitter into two light beams, said light receiving means includes a first photodetector for receiving one of the two light beams produced by said half mirror by dividing the incoming light beam and detecting it as main signal and a second photodetector for receiving the other light beam and detecting the angular displacement between the light beam to be transmitted and the received light beam, and said actuator is adapted to change the angle of the tracking mirror according to the output signal of said second photodetector.

5. An optical space transmitter comprising:
   a light source for emitting a light beam modulated according to a signal to be transmitted;
   an optical system for sending out the light beam emitted from said light source as a transmission light beam with an angle of expansion;
   a temperature detector for detecting the internal temperature of said optical space transmitter;
   control means for controlling said optical space transmitter such that the angle of expansion increases when the internal temperature detected by said temperature detector rises; and
   angle correcting means for correcting the angular displacement between the light beam to be transmitted and a received light beam,
   wherein said control means controls the device such that the angle of expansion decreases when the internal temperature detected by said temperature detector falls.

* * * * *

UNITED STATES PATENT AND TRADEMARK OFFICE
CERTIFICATE OF CORRECTION

PATENT NO. : 7,076,171 B2 Page 1 of 1
APPLICATION NO. : 09/822337
DATED : July 11, 2006
INVENTOR(S) : Masatoshi Ohtsubo It is certified that error appears in the above-identified patent and that said Letters Patent is hereby corrected as shown below:

COLUMN 2:
Line 8, "Summer" should read --summer--.
Line 30, "sun beams" should read --sunbeams--.
Line 61, "sun beams" should read --sunbeams--.

COLUMN 5:
Line 67, "further" should be deleted.

Signed and Sealed this

Twenty-fourth Day of July, 2007

JON W. DUDAS
*Director of the United States Patent and Trademark Office*